Figure 1:
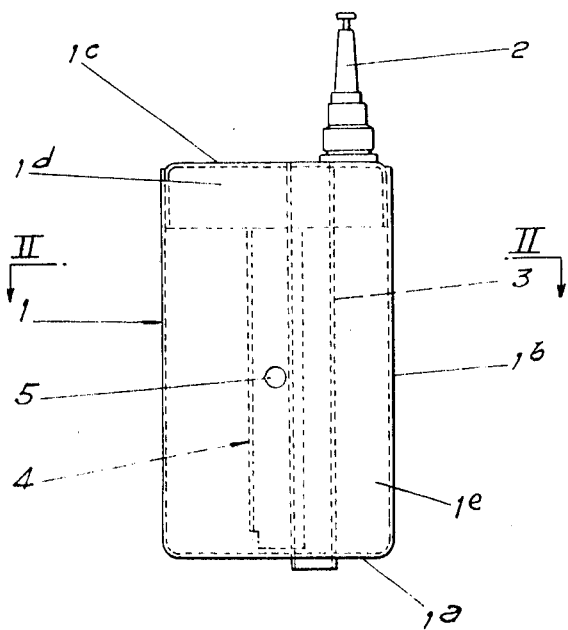

United States Patent

[11] 3,591,039

| [72] | Inventor | Robert R. Hocq<br>Boulogne-Billancourt, France |
|---|---|---|
| [21] | Appl. No. | 875,337 |
| [22] | Filed | Nov. 10, 1969 |
| [45] | Patented | July 6, 1971 |
| [73] | Assignee | Societe Franco-Hispano-Americaine<br>Francispam<br>Paris, France |
| [32] | Priority | Nov. 13, 1968 |
| [33] | | France |
| [31] | | 173471 |

[54] FUEL CONTAINER FOR GAS LIGHTER
3 Claims, 2 Drawing Figs.
[52] U.S. Cl.................................................. 220/71,
220/44 R, 220/89 A, 431/89
[51] Int. Cl........................................ B65d 7/44
[50] Field of Search.......................... 220/71, 22,
44, 89 A; 431/130, 131, 89

[56] References Cited
UNITED STATES PATENTS

| 2,477,398 | 7/1949 | Shatkin | 431/131 |
| 3,247,859 | 4/1966 | Traut et al. | 220/89 AX |
| 3,450,305 | 6/1969 | Kinnavy et al. | 220/89 A |

Primary Examiner—M. Henson Wood, Jr.
Assistant Examiner—John J. Love
Attorney—Curtis, Morris & Safford ABSTRACT: A fuel container for a gas lighter which is designed to avoid damage to a lighter in which it is installed should the pressure inside it rise to a dangerous level. The fuel container has a reinforcement inside it which is of H, I, U, or Z section with the flats of the reinforcement soldered to opposite inside walls of the container. The walls are also provided with openings in them which are sealed by the flats during normal conditions, but should the pressure rise beyond a predetermined level the solder connections to the walls are separated and the excess gas pressure is relieved through the openings.

PATENTED JUL 6 1971

3,591,039

INVENTOR
ROBERT RAYMOND HOCQ
BY
Curtis, Morris & Safford
ATTORNEYS

FUEL CONTAINER FOR GAS LIGHTER

This invention relates to a fuel container for a gas lighter and is more particularly concerned with a safety fuel container intended to avoid an explosion or possible distortion which might arise should the lighter in which the container is fitted be exposed to a sufficiently high temperature causing the gas pressure to increase dangerously inside the container, as such an explosion or distortion could damage the outer casing of the lighter. If the latter is a luxury lighter, an incident of this kind is most undesirable since it may very well make the lighter unusable.

Methods of reinforcing a fuel container are well known, especially in the case of a lighter using liquid gas, by employing supporting components of varying forms, especially I, T or U forms, and examples of reinforced fuel containers are given especially by French Pat. No. 1,314,802, German Utility Models Nos. 1,845,618 and 1,995,990, German Pat. No. 610,752, U.S. Pat. Nos. 2,681,554 and 2,732,697, and Belgian Pat. No. 450,401. But none of these fuel containers has a safety device providing for the case where, in spite of the presence of these reinforcements, an outer wall of the fuel container is distorted. For this reason the invention provides for a device forming a safety valve which eliminates the drawbacks of known fuel containers, consisting essentially of a combination of an emergency release orifice drilled in one wall of the fuel container, and of a stopping device which frees this orifice in the case of excess pressure.

A safety fuel container for a gas lighter in accordance with the invention comprises two substantially flat and opposed main sidewall portions which are liable to bulge away from each other under the action of an internal overpressure in the container and which are therefore interconnected by a reinforcement member located entirely within the container and having opposite end or side surfaces connected to the inside of the related container wall portions by means of a binding agent, preferably a solder, and is characterized in that each of said main sidewall portions of the container is provided with at least one substantially centrally located hole, which is covered on its inner side by the reinforcement member and has its border sealed thereto by the binding agent, said binding agent being of a kind permitting a tearing of the bond between the reinforcement member and at least one of said main sidewall portions of the container in order to open at least one of said holes, when a harmful overpressure is built up within the container. In this way the resistance of the fuel container is increased, but if, however, the internal pressure becomes excessive, the binding agent is detached and the reinforcing member no longer seals the holes in the fuel container walls, so that the gas can escape freely without damaging the lighter casing.

Figure 2:
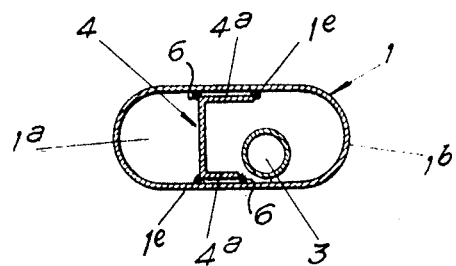

The invention may be performed in many ways and one specific embodiment will now be described by way of example with reference to the accompanying drawings in which:

FIG. 1 is an elevation of a fuel container according to the present invention, and FIG. 2 is a horizontal section on the line II–II of FIG. 1.

As shown in the drawings the fuel container 1, which is of a generally known type, comprises a main part having a base 1a, main sidewalls 1e and end walls 1b which fit into the lower part of the body of a lighter (not shown), and a top part 1c with a peripheral edge 1d which fits within the walls 1b, 1e and is secured to them by a suitable known binding agent according to the constituent of the container (for example soldered if the container is a metallic one).

The fuel container also has suitably inserted into its top, a gas-release valve 2 fitted with a relief device of known type which is actuated by a mechanism mounted on the lighter and with which the valve 2 automatically comes into engagement during assembly of the fuel container in the lighter. The fuel container 1 also has a vertical tube 3 extending through it soldered to its top 1c and to its bottom 1a which cooperates with a flint-carrier tube which is not shown and is an integral part of the lighter.

In accordance with the invention, in order to avoid distortions of the fuel container 1 which might occur if the lighter should be exposed to high temperatures, and thus abnormally high internal pressures, the main part of the fuel container is reinforced by a part 4 or U-shape or channel section with wings 4a secured to the main sidewalls 1e by a suitable binding agent 6, for example by soft tin solder if the container is made of metal, and which helps to prevent the distortion of these walls under the pressure of the gas. This distortion could cause distortion of the main body of the lighter and would in any case render it difficult to remove the fuel container. In addition at least one hole 5 is formed in the main sidewalls 1e of the fuel container under the wings 4a of reinforcement 4. This hole which is normally sealed by a wing 4a which thus ensures the correct sealing of the fuel container, acts as a safety valve to eliminate risk of accident. If the fuel container should swell in spite of reinforcement 4, this would become detached from sidewalls 1e due to the relatively low bonding properties of the binding agent 6, freeing the holes 5 through which the gas could escape to the outer air, avoiding risk of the fuel container bursting and thus the risk of damage to the outer casing of the lighter.

As is shown in FIG. 1, the reinforcement 4 only extends over the vertical surface of walls 1e which is not internally covered by the peripheral edge 1d of top 1c, without which it would be practically impossible to secure it to these walls.

It must be well understood that the method of manufacture described and shown is only an example, and may be modified in numerous ways without losing the essential characteristics of the invention.

In particular, the fuel container could be made without a cross tube such as 3 and be made either of plastic material or of metal but with a different construction, e.g. be formed by two symmetrical shells bound or soldered to one another on the median plane of the finished fuel container.

What I claim is:

1. A safety fuel container for a gas lighter and of the type having two substantially flat and opposed main sidewall portions which are liable to bulge away from each other under the action of an internal overpressure in the container and which are therefore interconnected by a reinforcement member located entirely within the container and having opposite end or side surfaces connected to the inside of the related container wall portion by means of a binding agent, characterized in that each of said main sidewall portions of the container is provided with at least one substantially centrally located hole, which is covered on its inner side by the reinforcement member, said reinforcement member having its border sealed to said main sidewall portions by the binding agent, said binding agent being of a kind permitting a tearing of the bond between the reinforcement member and at least one of said main sidewall portions of the container in order to open at least one of said holes, when a harmful overpressure is built up within the container.

2. A fuel refill container according to claim 1 and which is made of thin metal, characterized in that the binding agent is a soft solder.

3. A fuel container according to claim 1, characterized in that the reinforcement member, in a manner known per se, has relatively thin flange portions extending in contact with the inside of each one of the respective main sidewall portions of the container and covering the holes in them.